(12) United States Patent
Thurgate et al.

(10) Patent No.: US 10,717,349 B1
(45) Date of Patent: Jul. 21, 2020

(54) VEHICLE DOORS INCLUDING TORSION BAR SUPPORT ASSEMBLIES

(71) Applicant: Toyota Motor Engineering & Manufacturing North America, Inc., Plano, TX (US)

(72) Inventors: Brian T. Thurgate, Ypsilanti, MI (US); William A. Hardy, Tecumseh, MI (US); Kevin O'Beirne, Northville, MI (US); Johnny Rose, Ypsilanti, MI (US); Wasim Ukra, Canton, MI (US); Rajesh Chennagowni, Ann Arbor, MI (US); Herb Meingast, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 5 days.

(21) Appl. No.: 16/260,349

(22) Filed: Jan. 29, 2019

(51) Int. Cl.
  *B60J 5/10* (2006.01)
  *B62D 29/04* (2006.01)
  *B62D 27/02* (2006.01)

(52) U.S. Cl.
  CPC ............ *B60J 5/107* (2013.01); *B62D 27/023* (2013.01); *B62D 29/043* (2013.01)

(58) Field of Classification Search
  CPC ....... B60J 5/107; B62D 27/023; B62D 29/043
  USPC ...................................... 296/146.5
  See application file for complete search history.

(56) References Cited

U.S. PATENT DOCUMENTS

| 6,241,307 B1* | 6/2001 | Kim .......................... B60J 5/101 296/106 |
| 7,059,653 B2* | 6/2006 | Oberheide ............ E05F 1/1033 296/146.1 |
| 7,399,022 B2* | 7/2008 | Kalmbach ................ B60J 5/107 296/146.5 |
| 8,419,108 B2* | 4/2013 | Leterrier .................. B60J 5/107 296/146.5 |
| 8,635,757 B2* | 1/2014 | Bartsch ................. E05F 1/1238 29/428 |
| 8,646,829 B2* | 2/2014 | Crane ...................... B60J 5/101 296/146.5 |
| 9,145,171 B2 | 9/2015 | Kuenkler et al. |
| 9,211,782 B2* | 12/2015 | Rajon ...................... B60J 5/107 |
| 9,981,534 B2 | 5/2018 | Dassen et al. |
| 2019/0366813 A1* | 12/2019 | Grond-Soons ........... B60J 5/101 |

FOREIGN PATENT DOCUMENTS

| CN | 106184385 | 3/2018 |
| CN | 207241380 | 4/2018 |
| JP | 2006027486 | 2/2006 |
| KR | 101198665 | 11/2012 |

* cited by examiner

*Primary Examiner* — Pinel E Romain
(74) *Attorney, Agent, or Firm* — Dinsmore & Shohl LLP

(57) ABSTRACT

A vehicle door includes an inner panel formed from a resin and including an upper portion, and a lower portion positioned opposite the upper portion in a vertical direction, and a torsion bar assembly coupled to the inner panel, the torsion bar assembly including a lateral bar that extends across the upper portion of the inner panel in a lateral direction that is transverse to the vertical direction, a pair of vertical bars extending downward from the lateral bar, where the pair of vertical bars and the lateral bar define an inner cavity extending along the torsion bar assembly, and the lateral bar defines an access hole that provides access to the inner cavity.

20 Claims, 4 Drawing Sheets

VEHICLE DOORS INCLUDING TORSION BAR SUPPORT ASSEMBLIES

TECHNICAL FIELD

The present specification generally relates to vehicle door assemblies and, more specifically, vehicle door assemblies including torsion bar support assemblies.

BACKGROUND

Some vehicles include doors formed from a lightweight material, such as a polymer resin, a urethane resin, acrylic, or the like. Doors formed from lightweight materials may be generally lighter than doors formed from steel or aluminum, which may assist in lowering the overall weight of the vehicle and improving the vehicle's efficiency (e.g., fuel efficiency). However, doors formed from lightweight materials may be generally less rigid than doors formed from steel and aluminum, and the doors may elastically deform under forces under which a conventional door made of steel or aluminum would remain rigid. In larger vehicles including larger doors, elastic deformation resulting from torsional forces acting on the door may be amplified.

Accordingly, a need exists for structures to increase the rigidity of vehicle doors.

SUMMARY

In one embodiment, a vehicle door includes an inner panel formed from a resin and including an upper portion, and a lower portion positioned opposite the upper portion in a vertical direction, and a torsion bar assembly coupled to the inner panel, the torsion bar assembly including a lateral bar that extends across the upper portion of the inner panel in a lateral direction that is transverse to the vertical direction, a pair of vertical bars extending downward from the lateral bar, where the pair of vertical bars and the lateral bar define an inner cavity extending along the torsion bar assembly, and the lateral bar defines an access hole that provides access to the inner cavity.

In another embodiment, a vehicle door includes an inner panel including an upper portion defining a window aperture, and a lower portion positioned opposite the upper portion in a vertical direction, and a torsion bar assembly coupled to the inner panel, the torsion bar assembly including a lateral bar that extends across the inner panel above the window aperture in a lateral direction that is transverse to the vertical direction, and at least one vertical bar extending downward from the lateral bar along a lateral edge of the window aperture, where the lateral bar and the at least one vertical bar define an inner cavity extending along the torsion bar assembly, and the lateral bar defines an access hole that provides access to the inner cavity.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicle doors including torsion bar assemblies. Vehicle doors may be formed from resins or other lightweight materials to reduce the overall weight of a vehicle, which may assist in improving the efficiency of the vehicle (e.g., fuel economy). However, doors formed with resins and other lightweight materials may be more susceptible to elastic deformation than doors formed from steel or aluminum, and may elastically deform when being manipulated by a user, for example when being opened or closed to provide ingress to and egress from the vehicle. Elastic deformation of doors formed with resins and other lightweight materials may lead to customer dissatisfaction.

Vehicle doors described herein generally include an inner panel and a torsion bar assembly coupled to the inner panel. In embodiments, the inner panel is formed of a resin, which assists in lowering the overall weight of the vehicle door, while the torsion bar assembly is formed of a material that is different than the inner panel. The torsion bar assembly, in embodiments, generally includes a lateral bar that extends across an upper portion of the inner panel, and at least one vertical bar extending downward from the lateral bar. The at least one vertical bar and the lateral bar act to increase the rigidity of the vehicle door, which assists in resisting elastic deformation of the door as a result of torsional forces acting on the vehicle door.

In embodiments, the at least one vertical bar and the lateral bar define an inner cavity extending along the torsion bar assembly, and the lateral bar defines an access hole that provides access to the inner cavity. The inner cavity may allow for the overall weight of the torsion bar assembly to be minimized while maintaining a comparatively high section modulus. Furthermore, the access hole of the lateral bar may allow for easy installation of accessory wires routed through the torsion bar assembly. These and other embodiments will now be described with specific reference to the appended drawings.

Figure 1:
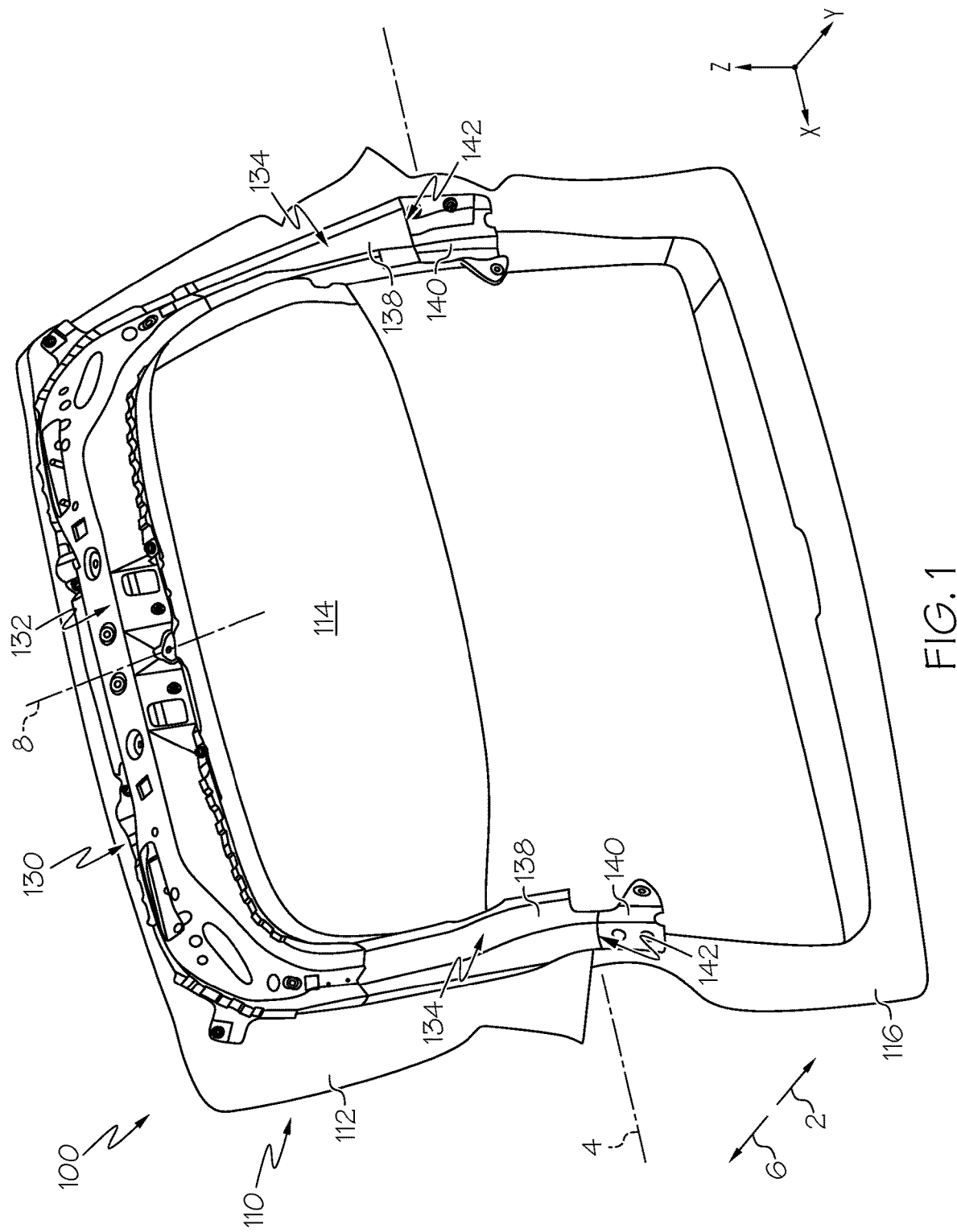
FIG. 1 schematically depicts front perspective view of an inner panel of a vehicle door and a torsion bar assembly, according to one or more embodiments shown and described herein.

As used herein, the term "longitudinal direction" refers to the forward-rearward direction of components of the vehicle door (i.e., in the +/−Y-direction depicted in FIG. 1). The term "lateral direction" refers to the cross-wise direction of components of the vehicle door (i.e., in the +/−X-direction depicted in FIG. 1), and is transverse to the longitudinal direction. The term "vertical direction" refers to the upward-downward direction of components of the vehicle door (i.e., in the +/−Z-direction depicted in FIG. 1). Further, the terms "inboard," "inward," "outboard," and "outward" are used to describe the relative positioning of various components of the vehicle door in directions referencing a vehicle centerline 4 that bisects the vehicle in the longitudinal direction. Referring to FIG. 1, the terms "outboard" or "outward" describe the relative location of a component in direction 2 with reference to the vehicle centerline 4. The term "inboard" or "inward" as used herein describes the relative location of a component in direction 6 with reference to the vehicle centerline 4.

Referring initially to FIG. 1, a vehicle door 100 is schematically depicted. In the illustrated example, vehicle door 100 is a rear door that may be assembled to vehicle as an upward-opening door (e.g., a door that is coupled to a vehicle body at a top edge of the door and opens by rotating about the X-direction as depicted). However, it should be understood that the vehicle door 100 may also be a side-opening door (e.g., a door that is coupled to a vehicle body at a lateral edge of the door and opens by rotating about the Z-direction as depicted).

The vehicle door 100 generally includes an inner panel 110 including an upper portion 112 and a lower portion 116 positioned opposite the upper portion 112 in the vertical direction. When assembled, an outer fascia may be positioned outboard of and coupled to the inner panel 110 to form the vehicle door 100. The upper portion 112 generally defines a window aperture 114 extending through the upper portion 112 of the inner panel 110. In embodiments, a window may be positioned in the window aperture 114.

The inner panel 110, in embodiments, may be formed of a resin, such as a polymer, urethane, acrylic, or the like. Without being bound by theory, the inner panel 110, and accordingly the vehicle door 100, may be lighter than vehicle doors that are formed from metals, such as steel or aluminum in embodiments in which the inner panel 110 is formed with a resin. By reducing the weight of the vehicle door 100, vehicle efficiency (e.g., fuel efficiency) may be increased. However, resin may be more flexible than steel or aluminum, and vehicle doors 100 formed from resin may be susceptible to elastic deformation, for example, as a user opens or closes the vehicle door 100.

In embodiments, the vehicle door 100 includes a torsion bar assembly 130 coupled to the inner panel 110. In embodiments, the torsion bar assembly 130 generally includes a lateral bar 132 that extends across the upper portion 112 of the inner panel 110 in the lateral direction, and at least one vertical bar 134 that extends downward from the lateral bar 132 in the vertical direction. In some embodiments, the lateral bar 132 extends across the upper portion 112 of the inner panel 110 above the window aperture 114.

Figure 2:
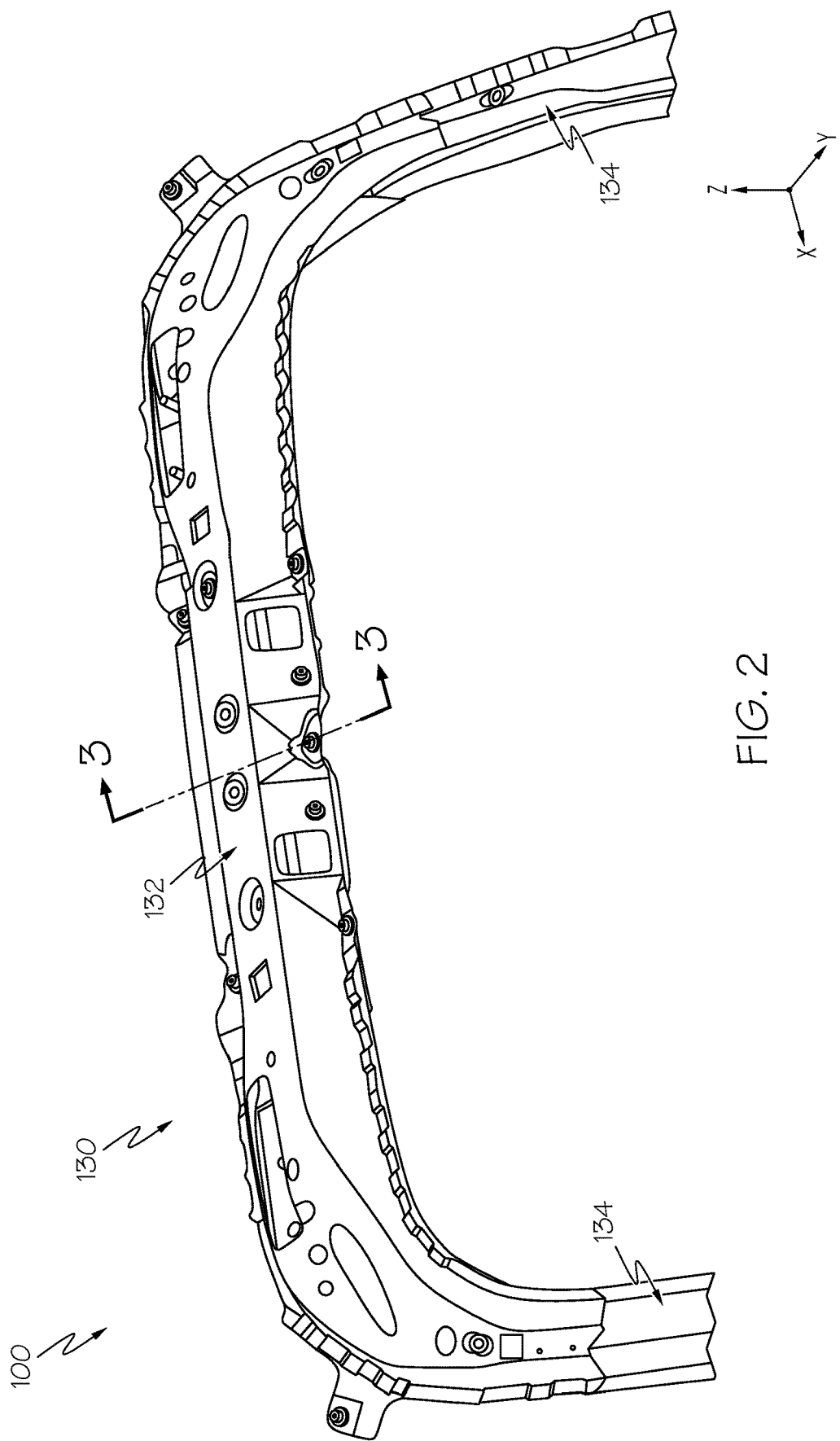
FIG. 2 schematically depicts a perspective view of the torsion bar assembly of FIG. 1 in isolation, according to one or more embodiments shown and described herein.

Referring collectively to FIGS. 1 and 2, in embodiments, the torsion bar assembly 130 includes a pair of vertical bars 134 extending downward from the lateral bar 132. In embodiments the pair of vertical bars 134 are positioned on opposite sides of the inner panel 110 in the lateral direction and are positioned on opposite sides of the window aperture 114. In embodiments, the pair of vertical bars 134 each extend between the upper portion 112 of the inner panel 110 and the lower portion 116 of the inner panel 110. The vertical bars 134, in some embodiments, each extend a similar distance in the vertical direction, such that the torsion bar assembly 130 is substantially symmetric about a torsion bar centerline 8 that bisects the torsion bar assembly 130 in the lateral direction. In some embodiments, each of the vertical bars 134 extend across at least 25% of the inner panel 110 evaluated in the vertical direction. In some embodiments, each of the vertical bars 134 extend across at least 50% of the inner panel 110 evaluated in the vertical direction. In some embodiments, each of the vertical bars 134 extend across at least 75% of the inner panel 110 evaluated in the vertical direction. By extending along a comparatively significant portion of the inner panel 110 evaluated in the vertical direction, the vertical bars 134 may assist in resisting torsional forces applied to the vehicle door 100, thereby increasing the rigidity of the vehicle door 100.

Figure 3:
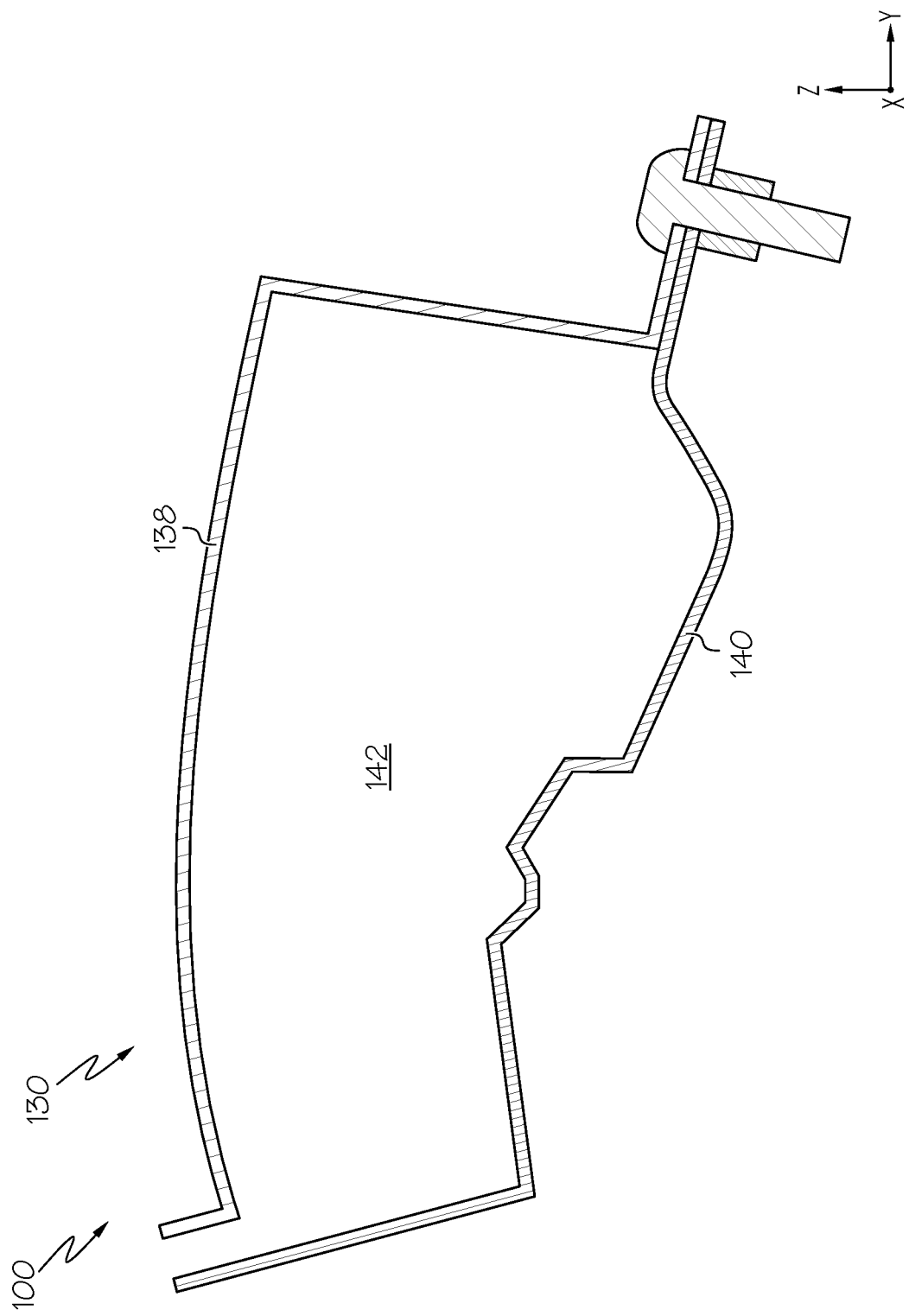
FIG. 3 schematically a section view of the torsion bar assembly along section 3-3 of FIG. 2, according to one or more embodiments shown and described herein.

Referring to FIGS. 2 and 3, the perspective view of the torsion bar assembly 130 and a section view of the torsion bar assembly 130 along section 3-3 of FIG. 2 are schematically depicted, respectively. In embodiments, the torsion bar assembly 130 generally includes an outer member 138 and an inner member 140 positioned inboard of the outer member 138 in the longitudinal direction. The outer member 138 and the inner member 140 generally define an inner cavity 142 that extends along the torsion bar assembly 130. In embodiments, the inner cavity 142 generally extends along the entire torsion bar assembly 130 (e.g., along both vertical bars 134 and along the lateral bar 132). In embodiments, the outer member 138 and the inner member 140 are separately formed and are coupled to one another in a suitable manner, such as and without limitation, welding, brazing, structural adhesives, mechanical fasteners, or the like. In embodiments, the outer member 138 and the inner member 140 are formed from a different material than the inner panel 110 (FIG. 1). For example, in embodiments, the outer member 138 and the inner member 140 may be formed of a metal, such as steel, aluminum, or the like, while the inner panel 110 (FIG. 1) may be formed of a resin, as described above. In embodiments, the outer member 138 and the inner member 140 may be formed through any suitable process, such as stamping, forging, or the like. In some embodiments, the outer member 138 and the inner member 140 are monolithic. In these embodiments, the torsion bar assembly 130 may be formed from an extrusion process, an additive manufacturing process, or the like.

The inner cavity 142 generally influences a cross-sectional area of the torsion bar assembly 130 as evaluated in the X-Y plane at the vertical bars 134, and as evaluated in the Y-Z plane at the lateral bar 132. The size and shape of the inner cavity 142 may be selected such that the cross-sectional area of the torsion bar assembly 130 is as high as practicable to fit within the vehicle door 100 (e.g., between the inner panel 110 (FIG. 1) and an outer fascia positioned outboard of the inner panel 110). Without being bound by theory, by selecting the size and shape of the inner cavity 142 to increase the cross-sectional area of the torsion bar assembly 130, the section modulus of the torsion bar assembly 130 may be increased. By increasing the section modulus of the torsion bar assembly 130, the rigidity of the torsion bar assembly 130 may be increased, which may assist in resisting torsional forces applied to the vehicle door 100. Additionally, by including the inner cavity 142, the rigidity of the torsion bar assembly 130 may be increased while maintaining a comparatively low overall weight, as compared to torsion bar assemblies that are solidly formed.

Figure 4:
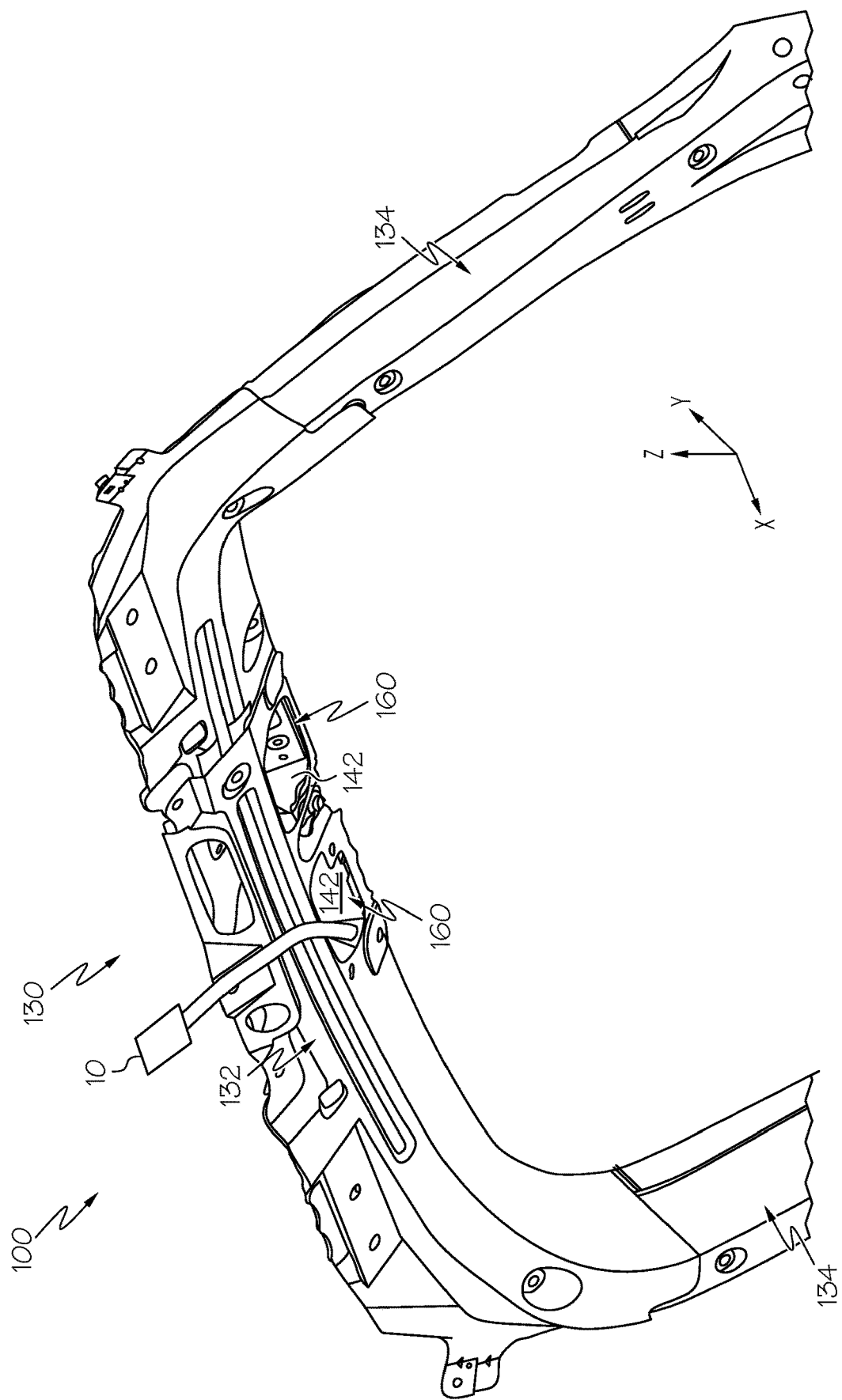
FIG. 4 schematically depicts a lower perspective view of the torsion bar assembly of FIG. 1, according to one or more embodiments shown and described herein.

Referring to FIG. 4, a lower perspective view of the torsion bar assembly 130 is schematically depicted. In embodiments, the lateral bar 132 defines an access hole 160 that provides access to the inner cavity 142. In the embodiment depicted in FIG. 4, the lateral bar 132 defines two access holes 160 positioned on an underside (e.g., a downward facing surface) of the lateral bar 132. The access hole or access holes 160 are in communication with the inner cavity 142, and in some embodiments, one or more accessory wires 10 may be routed through one of the access holes 160 and through the inner cavity 142. The accessory wire 10 may be utilized to connect various electrical devices in the vehicle, for example, speakers, accessory lighting, or the like. To retain the position of the accessory wire 10, in some vehicle configurations, it is desirable to route the accessory wire 10 through structures such as the torsion bar assembly 130. Accessory wires 10 may be installed as the vehicle is assembled, and may in some instances be removed and replaced over the life of the vehicle, for example as accessories of the vehicle are repaired or replaced. By providing one or more access holes 160 on the lateral bar 132 that are in communication with the inner cavity 142, the accessory wire 10 may be routed through the inner cavity 142 without requiring that accessory wire 10 be routed through the entire torsion bar assembly 130, which may simplify the routing of the accessory wire 10 through the torsion bar assembly 130. For example, because the inner cavity 142 is generally bounded by the outer member 138 and the inner member 140, the inner cavity 142 may be generally difficult for a user to access at certain locations along the torsion bar assembly 130. By routing the accessory wire 10 through the access holes 160, as compared to routing the accessory wire 10 through the entire support assembly 130, the difficulty of routing the accessory wire 10 through the torsion bar assembly 130 may be reduced.

It should now be understood that vehicle doors described herein generally include an inner panel and a torsion bar assembly coupled to the inner panel. In embodiments, the inner panel is formed of a resin, which assists in lowering the overall weight of the vehicle door, while the torsion bar assembly is formed of a material that is different than the inner panel. The torsion bar assembly, in embodiments, generally includes a lateral bar that extends across an upper portion of the inner panel, and at least one vertical bar extending downward from the lateral bar. The at least one vertical bar and the lateral bar act to increase the rigidity of the vehicle door, which assists in resisting elastic deformation of the door as a result of torsional forces acting on the vehicle door.

In embodiments, the at least one vertical bar and the lateral bar define an inner cavity extending along the torsion bar assembly, and the lateral bar defines an access hole that provides access to the inner cavity. The inner cavity may allow for the overall weight of the torsion bar assembly to be minimized, while maintaining a comparatively high section modulus. Furthermore, the access hole of the lateral bar may allow for easy installation of accessory wires routed through the torsion bar assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle door comprising:
   an inner panel formed from a resin and comprising:
      an upper portion; and
      a lower portion positioned opposite the upper portion in a vertical direction; and
   a torsion bar assembly coupled to the inner panel, the torsion bar assembly comprising:
      a lateral bar that extends across the upper portion of the inner panel in a lateral direction that is transverse to the vertical direction;
      a pair of vertical bars extending downward from the lateral bar, wherein:
         the pair of vertical bars and the lateral bar define an inner cavity extending along the torsion bar assembly; and
         the lateral bar defines an access hole that provides access to the inner cavity.

2. The vehicle door of claim 1, wherein the torsion bar assembly is formed of a different material than the inner panel.

3. The vehicle door of claim 2, wherein the torsion bar assembly is formed from a metal.

4. The vehicle door of claim 1, wherein the torsion bar assembly defines a torsion bar centerline that bisects the torsion bar assembly in the lateral direction, wherein the torsion bar assembly is substantially symmetric about the torsion bar centerline.

5. The vehicle door of claim 1, wherein each of the pair of vertical bars extend across at least 25% of the inner panel evaluated in the vertical direction.

6. The vehicle door of claim 1, wherein each of the pair of vertical bars extend across at least 50% of the inner panel evaluated in the vertical direction.

7. The vehicle door of claim 1, wherein the upper portion of the inner panel defines a window aperture extending through the inner panel, and wherein the lateral bar of the torsion bar assembly is positioned above the window aperture.

8. The vehicle door of claim 1, wherein the torsion bar assembly comprises an outer member and an inner member positioned coupled to and positioned inboard of the outer member, wherein the outer member and the inner member define the inner cavity extending along the torsion bar assembly.

9. The vehicle door of claim 1, further comprising an accessory wire inserted through the access hole and extending along the inner cavity.

10. A vehicle door comprising:
    an inner panel comprising:
       an upper portion defining a window aperture; and
       a lower portion positioned opposite the upper portion in a vertical direction; and
    a torsion bar assembly coupled to the inner panel, the torsion bar assembly comprising:
       a lateral bar that extends across the inner panel above the window aperture in a lateral direction that is transverse to the vertical direction; and
       at least one vertical bar extending downward from the lateral bar along a lateral edge of the window aperture, wherein:
          the lateral bar and the at least one vertical bar define an inner cavity extending along the torsion bar assembly; and
          the lateral bar defines an access hole that provides access to the inner cavity.

11. The vehicle door of claim 10, wherein the torsion bar assembly and the inner panel are formed from different materials.

12. The vehicle door of claim 11, wherein the inner panel is formed from a resin.

13. The vehicle door of claim 11, wherein the torsion bar assembly is formed from a metal.

14. The vehicle door of claim 10, wherein the at least one vertical bar extends across at least 25% of the inner panel evaluated in the vertical direction.

15. The vehicle door of claim 10, wherein the at least one vertical bar extends across at least 50% of the inner panel evaluated in the vertical direction.

16. The vehicle door of claim 10, wherein the at least one vertical bar is a first vertical bar, and the torsion bar assembly comprises a second vertical bar extending downward from the lateral bar in the vertical direction, wherein the first vertical bar and the second vertical bar are positioned on opposite sides of the window aperture and each extend across at least at least 25% of the inner panel evaluated in the vertical direction.

17. The vehicle door of claim 16, wherein the torsion bar assembly defines a torsion bar centerline that bisects the torsion bar assembly in the lateral direction, wherein the torsion bar assembly is substantially symmetric about the torsion bar centerline.

18. The vehicle door of claim 10, wherein the torsion bar assembly comprises an outer member and an inner member coupled to and positioned inboard of the outer member, the outer member and the inner member defining the inner cavity extending along the torsion bar assembly.

19. The vehicle door of claim 10, wherein the torsion bar assembly is monolithically formed.

20. The vehicle door of claim 10, further comprising an accessory wire inserted through the access hole and extending along the inner cavity.

* * * * *